United States Patent
Murakami et al.

(10) Patent No.: US 11,052,491 B2
(45) Date of Patent: Jul. 6, 2021

(54) GALVANO SCANNER AND LASER MACHINING SYSTEM

(71) Applicant: FANUC CORPORATION, Yamanashi (JP)

(72) Inventors: Yoshinori Murakami, Yamanashi (JP); Satoru Kawai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 153 days.

(21) Appl. No.: 16/043,273

(22) Filed: Jul. 24, 2018

(65) Prior Publication Data

US 2019/0061064 A1 Feb. 28, 2019

(30) Foreign Application Priority Data

Aug. 24, 2017 (JP) .............................. JP2017-161237

(51) Int. Cl.
 *B23K 26/70* (2014.01)
 *B23K 26/082* (2014.01)
 *B23K 26/08* (2014.01)

(52) U.S. Cl.
 CPC .......... *B23K 26/706* (2015.10); *B23K 26/082* (2015.10); *B23K 26/0821* (2015.10); *B23K 26/0884* (2013.01); *B23K 26/702* (2015.10)

(58) Field of Classification Search
 CPC ................ B23K 26/706; B23K 26/082; B23K 26/0821; B23K 26/702; B23K 26/0884
 USPC ............................. 219/121.8, 121.6, 121.78
 See application file for complete search history.

(56) References Cited

U.S. PATENT DOCUMENTS

| | | | | |
|---|---|---|---|---|
| 2006/0261047 A1* | 11/2006 | Fukunaka | ............ | B23K 1/0056 219/121.63 |
| 2010/0072180 A1* | 3/2010 | Schuermann | .......... | B23K 26/38 219/121.67 |
| 2016/0368091 A1* | 12/2016 | Takahashi | ............ | B23K 26/064 |

FOREIGN PATENT DOCUMENTS

| | | |
|---|---|---|
| CN | 101331592 B | 6/2010 |
| CN | 102157709 A | 8/2011 |
| DE | 20 2014 003 488 U1 | 7/2015 |
| DE | 102014203798 A1 | 9/2015 |
| JP | 2001-509889 A | 7/2001 |
| JP | 2001-259872 A | 9/2001 |
| JP | 2001-334381 A | 12/2001 |

(Continued)

OTHER PUBLICATIONS

An Office Action mailed by the State Intellectual Property Office of the People's Republic of China dated Jan. 21, 2020, which corresponds to Chinese Patent Application No. 201810949720.0 and is related to U.S. Appl. No. 16/043,273.

(Continued)

*Primary Examiner* — Tu B Hoang
*Assistant Examiner* — Alba T Rosario-Aponte
(74) *Attorney, Agent, or Firm* — Studebaker & Brackett PC

(57) ABSTRACT

A galvano scanner that irradiates an object with a laser beam to perform machining, the galvano scanner comprising: an emission unit that emits the laser beam; a protective glass that protects the emission unit from a scattered matter generated in machining; and a glass holding mechanism that holds the protective glass, the protective glass at least including a triple structure in a vertical direction, the glass holding mechanism holding the protective glass that is the lowermost layer in the protective glass having the triple (Continued)

structure so that the protective glass that is the lowermost layer can be fallen off downward.

1 Claim, 11 Drawing Sheets

(56) References Cited

FOREIGN PATENT DOCUMENTS

| | | | |
|---|---|---|---|
| JP | 2001334381 A | * | 12/2001 |
| JP | 2008-200741 A | | 9/2008 |
| JP | 2010-240674 A | | 10/2010 |
| JP | 2015-157297 A | | 9/2015 |
| KR | 10-0634623 B1 | | 10/2006 |
| KR | 10-2014-0065776 A | | 5/2014 |
| KR | 20140065776 A | * | 5/2014 |

OTHER PUBLICATIONS

An Office Action; "Notice of Reasons for Refusal," issued by the Japanese Patent Office dated May 21, 2019, which corresponds to Japanese Patent Application No. 2017-161237 and is related to U.S. Appl. No. 16/043,273; with English Translation.
An Office Action mailed by the German Patent Office dated Jul. 16, 2020, which corresponds to German Patent Application No. 102018005792.6 and is related to U.S. Appl. No. 16/043,273; with English language Concise Explanation.

* cited by examiner

GALVANO SCANNER AND LASER MACHINING SYSTEM

This application is based on and claims the benefit of priority from Japanese Patent Application No. 2017-161237, filed on 24 Aug. 2017, the content of which is incorporated herein by reference.

BACKGROUND OF THE INVENTION

Field of the Invention

The present invention relates to a galvano scanner that irradiates an object with a laser beam to perform machining, and a laser machining system including the galvano scanner.

Related Art

As a laser machining system that irradiates a workpiece (object) with a laser beam to perform machining such as welding, a system including a galvano scanner that emits a laser beam, in a tip end of an arm of a multi-axes robot, is known (for example, see Patent Document 1, and the like).

A galvano scanner is a device that includes two mirrors capable of rotating respectively around two rotation axes orthogonal to each other, and scans a laser beam emitted from a laser beam source by driving the mirrors with a servo motor to rotate. In a galvano scanner, a protective glass is installed in an emission unit in order to prevent a scattered matter scattered from a workpiece at the time of laser machining from being adhered to the emission unit that emits a laser beam.

FIG. 11 is a diagram schematically showing a conventional galvano scanner. A galvano scanner 100 includes a protective glass 102 in an emission unit 101 that emits a laser beam L. Generally, the protective glass 102 is installed by being made double in order to improve maintainability, and a first protective glass 103 that is the lowermost layer and a second protective glass 104 that is an upper layer of the first protective glass 103 compose the protective glass 102.

Among the protective glass 102 that has made double, the second protective glass 104 is fixed to the emission unit 101 of the galvano scanner 100. On the other hand, the first protective glass 103 that is the lowermost layer is attached attachably and detachably to the second protective glass 104 by a clamp 105, a screw, or the like.

A stain 200 due to a scattered matter scattered at the time of laser machining may be adhered to the first protective glass 103 that is the lowermost layer. When the stain 200 is adhered to the first protective glass 103, part of the laser beam is blocked by the stain 200, a laser beam amount with which irradiation is performed to the workpiece decreases, and this is a factor that decreases machining quality. Thus, the laser machining system monitors whether the stain 200 is adhered to the first protective glass 103. When the laser machining system detects that the stain 200 is adhered to the first protective glass 103, the first protective glass 103 is exchanged.

A method of detecting that a stain is adhered to a protective glass is known from before. For example, since, when a stain is adhered to a protective glass, a laser beam hits the stain and is scattered, a method of optically detecting the scattered light by a photodetector (for example, see Patent Document 2), a method of arranging a camera near the protective glass and detecting the stain adhered to the protective glass by the camera (for example, see Patent Document 3), and the like are known.

Patent Document 1: Japanese Unexamined Patent Application, Publication No. 2015-157297
Patent Document 2: Japanese Unexamined Patent Application (Translation of PCT Application), Publication No. 2001-509889
Patent Document 3: Japanese Unexamined Patent Application, Publication No. 2010-240674

SUMMARY OF THE INVENTION

When the first protective glass 103 to which the stain 200 is adhered is exchanged, for securing safety, a worker manually operates the clamp 105, the screw, or the like after once stopping a line, detaches the stained first protective glass 103, and then, performs work of attaching a new different first protective glass. This is because automation is difficult, since a robot cannot operate the clamp 105, the screw, or the like. Thus, there is a problem that downtime of the line increases, and working efficiency decreases.

Thus, an object of the present invention is to provide a galvano scanner and a laser machining system capable of automatically detaching a stained protective glass without manual operation, and minimizing downtime.

(1) A galvano scanner according to the present invention is a galvano scanner (for example, a galvano scanner 3 described later) that irradiates an object with a laser beam to perform machining, the galvano scanner including: an emission unit (for example, an emission unit 30 described later) that emits a laser beam (for example, a laser beam L described later); a protective glass (for example, a protective glass 5 described later) that protects the emission unit from a scattered matter generated in machining; and a glass holding mechanism (for example, a glass holding mechanism 6, 7 described later) that holds the protective glass, the protective glass at least including a triple structure in a vertical direction, the glass holding mechanism holding the protective glass (for example, a first protective glass 51 described later) that is the lowermost layer in the protective glass having the triple structure, so that the protective glass that is the lowermost layer can be fallen off downward.

(2) In the galvano scanner according to (1), the galvano scanner may be provided in a tip end of an arm (for example, an arm 21 described later) of a robot (for example, a robot 2 described later), and the glass holding mechanism may have a structure in which the protective glass that is the lowermost layer is fallen off downward by operation of the robot.

(3) In the galvano scanner according to (1) or (2), the glass holding mechanism may have an engaging mechanism (for example, an engaging mechanism 60 described later) that is provided in the protective glass that is the lowermost layer, can perform engaging and releasing of the engaging directly or indirectly with respect to the protective glass (for example, a second protective glass 52 described later) that is an upper layer of the protective glass that is the lowermost layer, and a through hole (for example, a through hole 63 described later) through which a pin (for example, a pin 43 described later) can be inserted, and the glass holding mechanism may have a structure in which the protective glass that is the lowermost layer is fallen off downward when the engaging mechanism is released by insertion of the pin to the through hole.

(4) In the galvano scanner according to (1) or (2), the glass holding mechanism may have a friction mechanism (for example, a friction mechanism 70 described later) that pushes directly or indirectly an outside surface of the protective glass that is the lowermost layer, and holds the protective glass that is the lowermost layer by friction force, and the glass holding mechanism may have a structure in which the protective glass that is the lowermost layer is fallen off downward when the protective glass that is the lowermost layer is pulled out downward against the friction force by the friction mechanism.

(5) A laser machining system according to the present invention is a laser machining system (for example, a laser machining system 1 described later) including: the galvano scanner (for example, a galvano scanner 3 described later) according to any of (1) to (4); a movement means (for example, a robot 2 described later) that moves the galvano scanner; a control unit (for example, a scanner control unit 12 or a robot control unit 11 described later) that controls operation of the galvano scanner and the movement means; and a stain detection unit (for example, a stain detection unit 14 described later) that detects a stain in the protective glass that is the lowermost layer of the galvano scanner, the laser machining system further including a protective glass receiving unit (for example, a protective glass receiving unit 4 described later) that receives the protective glass that is the lowermost layer fallen off downward from the galvano scanner, the control unit controlling operation of the movement means so as to move the galvano scanner to the protective glass receiving unit when the stain in the protective glass that is the lowermost layer is detected by the stain detection unit, and to cause the protective glass that is the lowermost layer held by the glass holding mechanism to be fallen off to the protective glass receiving unit.

With a galvano scanner and a laser machining system according to the present invention, a stained protective glass can be automatically detached without manual operation, and downtime can be minimized.

DETAILED DESCRIPTION OF THE INVENTION

Figure 1:
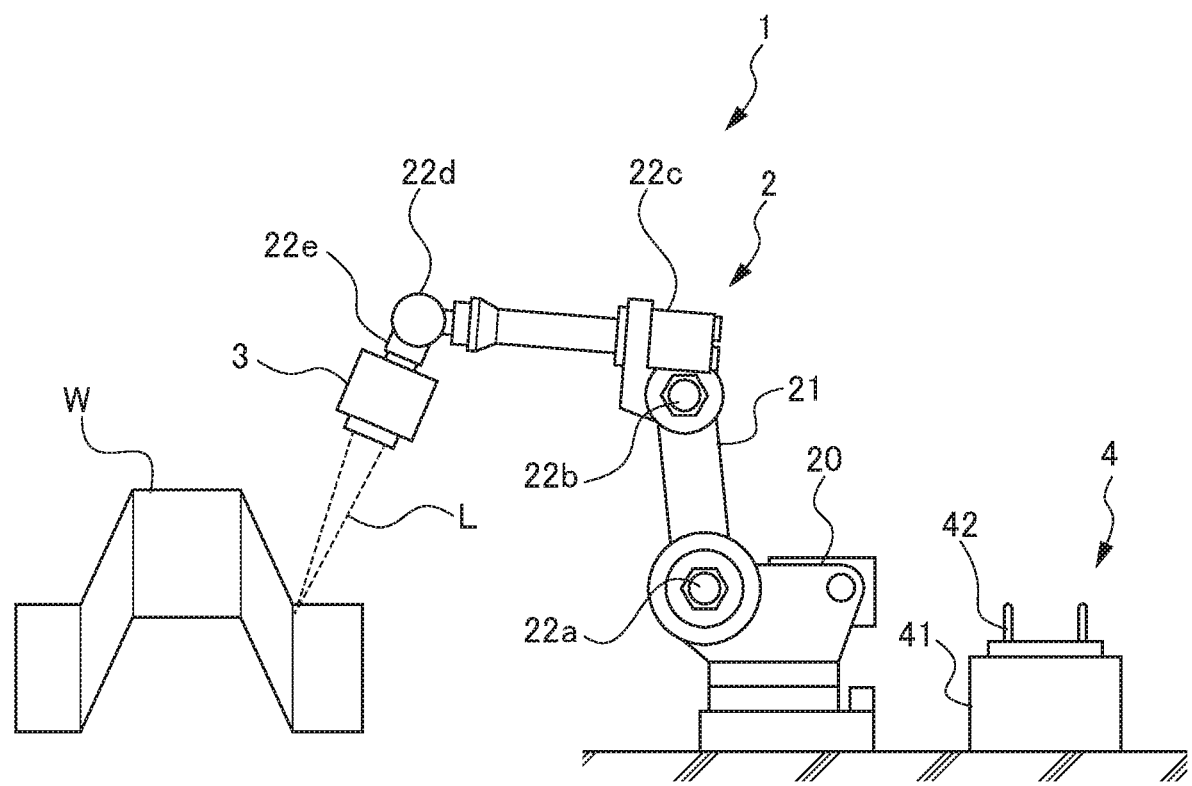
FIG. 1 is a diagram showing an example of a laser machining system including a galvano scanner according to the present invention.
Figure 2:
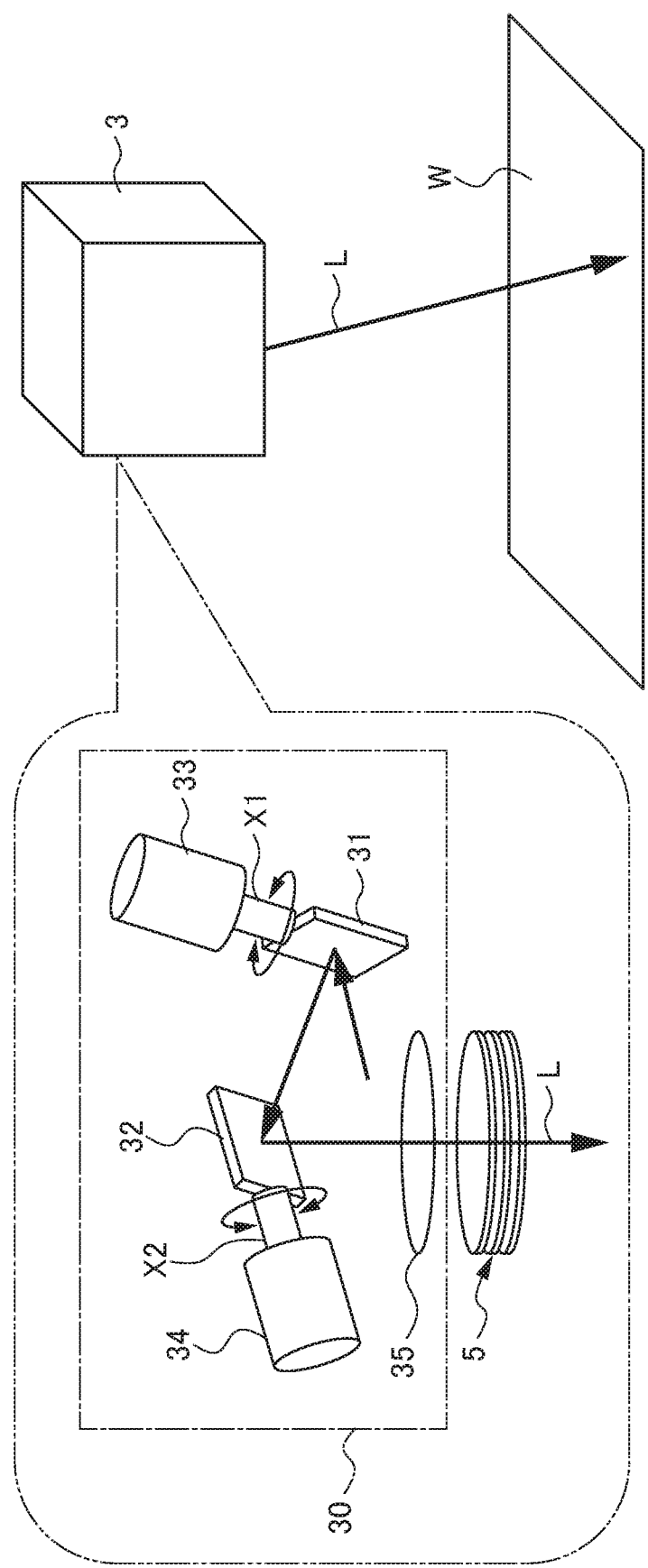
FIG. 2 is a diagram schematically showing a configuration of an example of the galvano scanner according to the present invention.

Embodiments of the present invention will be described below with reference to drawings. FIG. 1 is a diagram showing an example of a laser machining system including a galvano scanner according to the present invention. FIG. 2 is a diagram schematically showing a configuration of an example of the galvano scanner according to the present invention. FIG. 1 exemplifies a remote laser welding system as a laser machining system. As shown in FIG. 1, a remote laser welding system 1 includes a robot 2, a galvano scanner 3, and a protective glass receiving unit 4.

The robot 2 is composed of a multi-axes robot, and includes a base part 20, an arm 21 extending from the base part 20, a plurality of joint axes 22a to 22e rotating the arm 21, and a robot motor not shown composed of a servo motor driving the joint axes 22a to 22e. Operation of the robot 2 is controlled by a robot control unit described later. This robot 2 is an example of a movement means in the present invention.

The galvano scanner 3 is provided in a tip end of the arm 21 of the robot 2. The galvano scanner 3 functions as a laser machining head that emits a laser beam L from a laser beam source described later, and scans the laser beam L to a butt machining point (butt welding point) of a workpiece W. Operation of the galvano scanner 3 is controlled by a scanner control unit described later.

This remote laser welding system 1 transports the galvano scanner 3 in the tip end of the arm 21 by operation of the robot 2, and irradiates a butt machining point (butt welding point) of the workpiece W such as an automotive body with the laser beam L from the galvano scanner 3, while swinging the laser beam L, to perform, for example, weaving welding.

As shown in FIG. 2, the galvano scanner 3 has two galvano mirrors 31, 32 that sequentially reflect the laser beam L from the laser beam source, two galvano motors 33, 34 that drive the galvano mirrors 31, 32 to rotate around rotation axes X1, X2, respectively, and a focusing lens 35 that focuses and emits the laser beam L. These galvano mirrors 31, 32, the galvano motors 33, 34, and the light focusing lens 35 compose an emission unit 30. The galvano scanner 3 further includes a protective glass 5 that protects the emission unit 30, and a glass holding mechanism 6 that holds the protective glass 5.

The galvano mirrors 31, 32 are configured to be rotatable around the two rotation axes X1, X2 orthogonal to each other, respectively. The galvano motors 33, 34 are composed of a servo motor, and drive the galvano mirrors 31, 32 to rotate to scan the laser beam L emitted from the laser beam source (not shown in FIG. 2).

As shown in FIG. 2, the laser beam L from the laser beam source is sequentially reflected by the two galvano mirrors 31, 32. The laser beam L is focused by the light focusing lens 35, transmits the protective glass 5 protecting the emission unit 30, and then, is emitted to the workpiece W. At this time, when the two galvano mirrors 31, 32 are driven to rotate by the galvano motors 33, 34, an incident angle of the laser beam L incident in these galvano mirrors 31, 32 continuously changes. As a result, the laser beam L sequentially reflected by the galvano mirrors 31, 32 and reaching the workpiece W is scanned along a predetermined scanning path on the workpiece W.

Although details are described later, the protective glass receiving unit 4 is a part that receives the protective glass fallen off downward from the galvano scanner 3, and is arranged within a movement range of the arm 21 of the robot 2. The protective glass receiving unit 4 has a base 41, and a jig 42 used in causing the protective glass to be fallen off downward onto the base 41.

Figure 3:
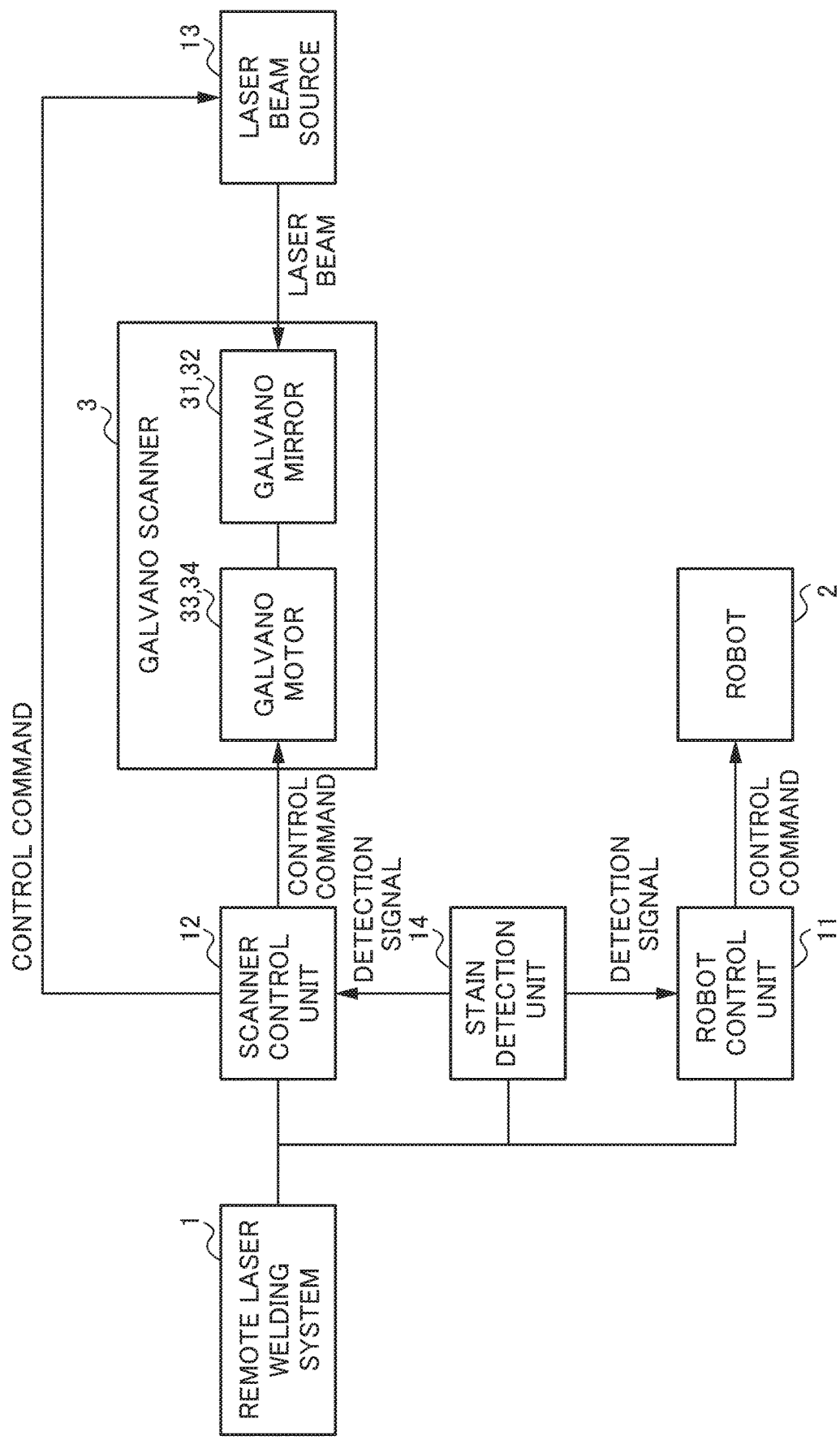
FIG. 3 is a functional block diagram of the laser machining system shown in FIG. 1.

FIG. 3 is a functional block diagram of the remote laser welding system 1 shown in FIG. 1. As shown in FIG. 3, the remote laser welding system 1 is mainly composed of: the robot 2 described above; the galvano scanner 3; a robot control unit 11 that controls the robot 2; a scanner control unit 12 that controls the galvano scanner 3; a laser beam source 13 that emits the laser beam L to the galvano scanner 3; and a stain detection unit 14 that detects a stain in the protective glass 5.

The robot control unit 11 outputs a control command to each robot motor of the robot 2 described above, to drive the joint axes 22*a* to 22*e*, and transport the galvano scanner 3 provided in the tip end of the arm 21 to a desired position.

The scanner control unit 12 outputs a control command to the galvano motors 33, 34 of the galvano scanner 3 described above, to adjust the incident angle of the laser beam L incident in the galvano mirrors 31, 32. Thereby, an irradiation position of the laser beam L emitted from the galvano scanner 3 to the workpiece W is adjusted. The scanner control unit 12 controls the emission of the laser beam from the laser beam source 13 to the galvano scanner 3.

The stain detection unit 14 detects that a scattered matter scattered from the workpiece W is adhered to the protective glass 5 of the galvano scanner 3 at the time of laser machining (laser welding). In the present invention, a particular stain detection means composing this stain detection unit 14 is not limited. For example, as described above, a known means can be adopted, such as a means of optically detecting a scattered light that is the laser beam hitting the stain and scattered, by a photo detector, or a means of arranging a camera near the protective glass and detecting a stain adhered to the protective glass by the camera. When the stain detection unit 14 detects that the stain is adhered to the protective glass 5, the stain detection unit 14 outputs a detection signal to each of the robot control unit 11 and the scanner control unit 12. When this detection signal is input, the robot control unit 11 controls the robot 2 to move the galvano scanner 3 to the protective glass receiving unit 4. When the detection signal is input, the scanner control unit 12 stops the emission of the laser beam from the laser beam source 13 to the galvano scanner 3.

Figure 4:
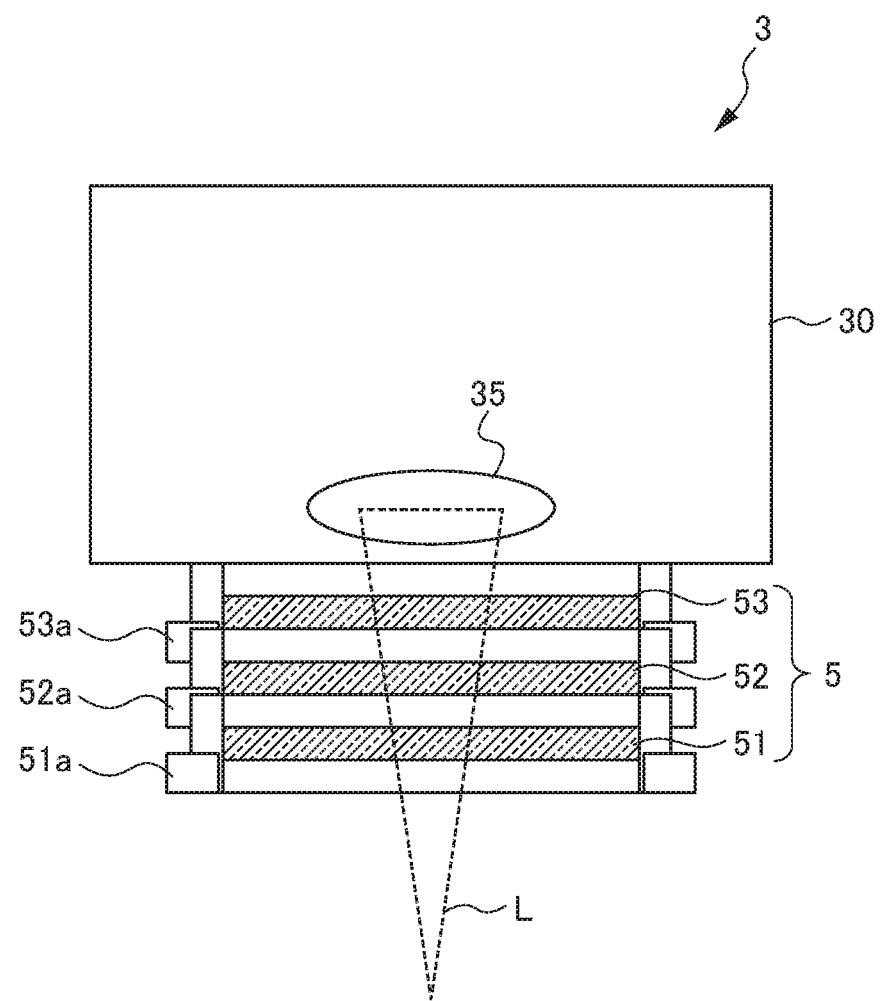
FIG. 4 is a diagram schematically showing a configuration of a protective glass of the galvano scanner according to the present invention.

Next, the protective glass 5 will be further described in detail. FIG. 4 is a diagram schematically showing a configuration of the protective glass 5 of the galvano scanner 3 according to the present invention. The protective glass 5 is attached to the emission unit 30 of the galvano scanner 3 that emits the laser beam L.

The protective glass 5 described in the present embodiment has three protective glasses of a first protective glass 51, a second protective glass 52, and a third protective glass 53, in order from below, and has a triple structure in which these three protective glasses 51 to 53 are laminated in a vertical direction. The first protective glass 51 corresponds to a "protective glass that is the lowermost layer" in the present invention. The second protective glass 52 corresponds to a "protective glass that is an upper layer of the protective glass that is the lowermost layer" in the present invention. The vertical direction referred here is a direction along an emission direction of the laser beam L emitted from the emission unit 30 of the galvano scanner 3, and is a direction in which the third protective glass 53 is up and the first protective glass 51 is down.

Each of the protective glasses 51 to 53 are formed of a thin cylindrical glass plate. Outer circumferences of the protective glasses 51 to 53 have glass holders 51*a* to 53*a*, respectively. In these protective glasses 51 to 53, only the third protective glass 53 that is the uppermost layer is fixed to the emission unit 30 of the galvano scanner 3 via the glass holder 53*a*, and cannot be exchanged. The second protective glass 52 is attachably and detachably attached to the glass holder 53*a* of the third protective glass 53 by a known clamp, a screw, or the like (not shown in FIG. 4) via the glass holder 52*a*. On the other hand, the first protective glass 51 includes a glass holding mechanism described later. The glass holding mechanism holds the first protective glass 51 so that the first protective glass 51 can be easily fallen off downward of a gravity direction from the second protective glass 52 that is the upper layer of the first protective glass 51. In the description below, unless otherwise noted, description, the "protective glass", includes a glass holder.

First Embodiment of Glass Holding Mechanism

Figure 5:
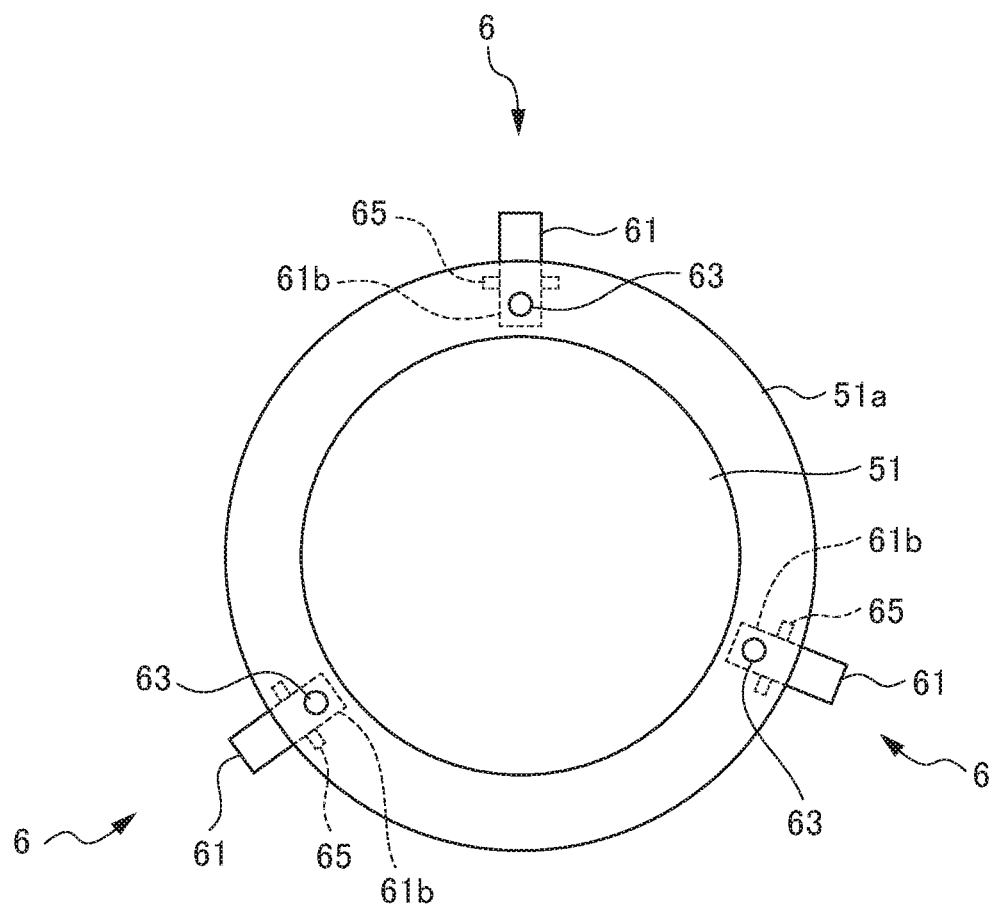
FIG. 5 is a diagram of a protective glass that is the lowermost layer having a glass holding mechanism according to a first embodiment, viewed from below.
Figure 6:
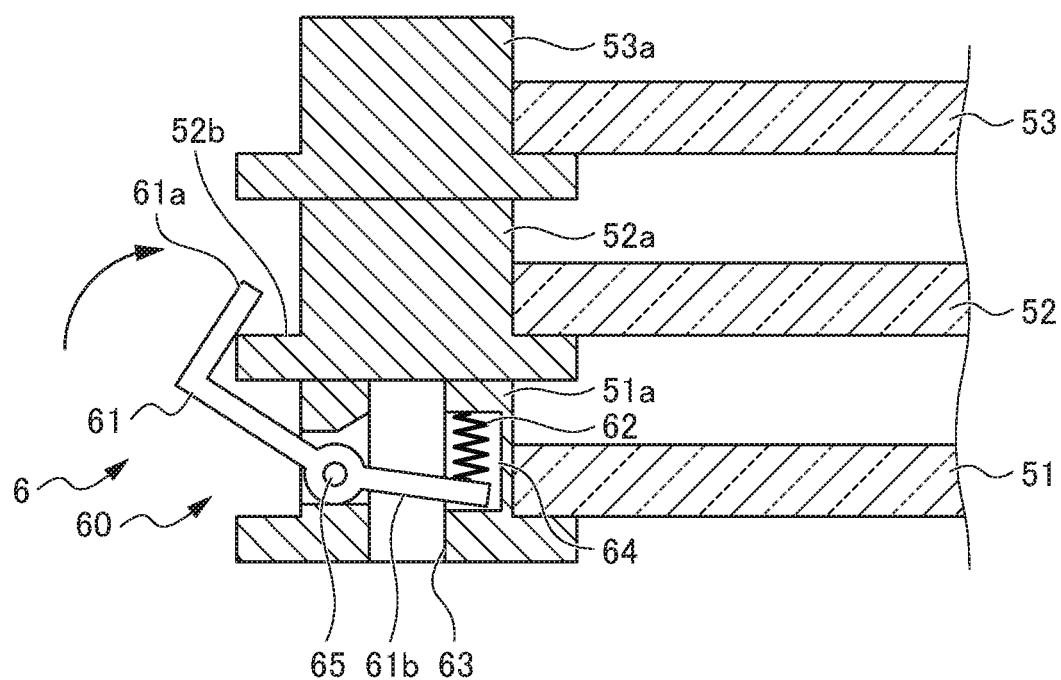
FIG. 6 is a partial sectional view explaining a situation where the glass holding mechanism shown in FIG. 5 holds the protective glass that is the lowermost layer.
Figure 7:
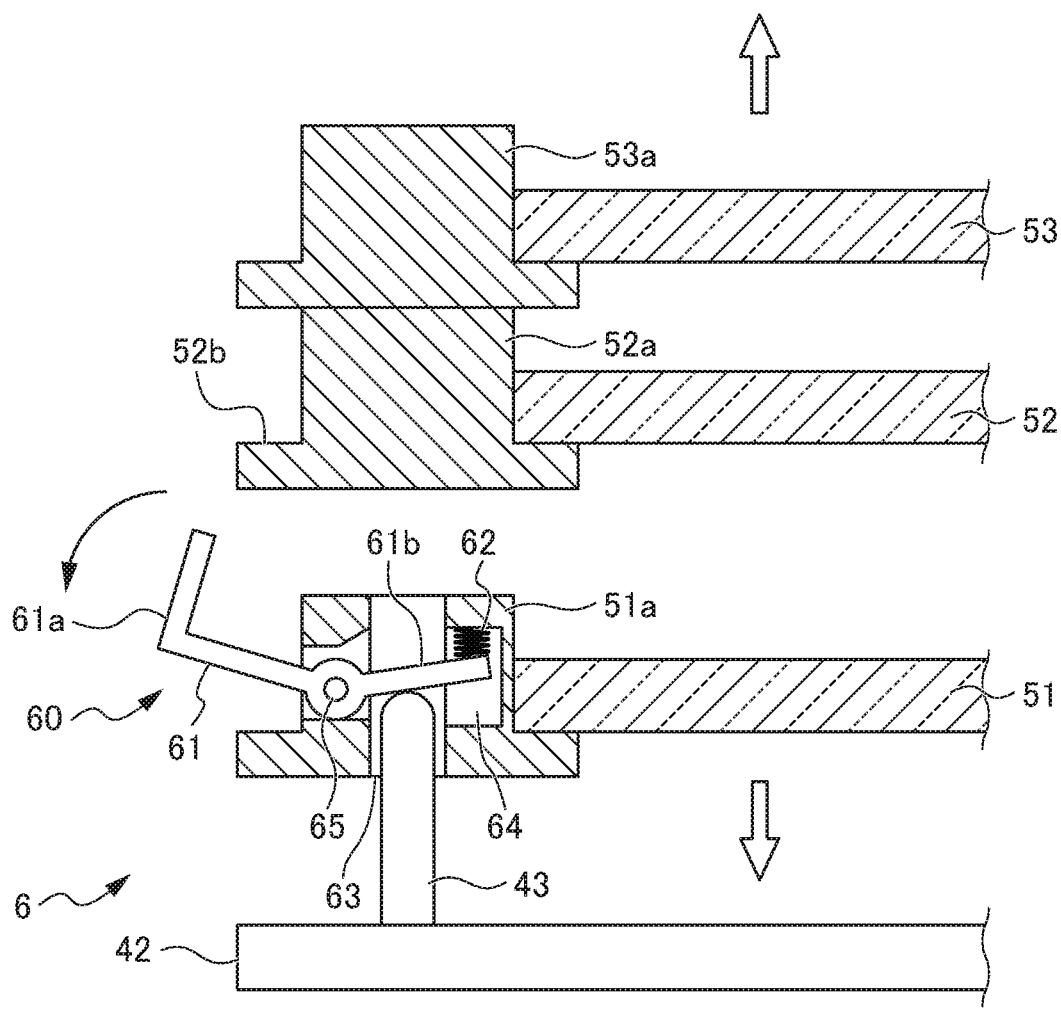
FIG. 7 is a partial sectional view explaining a situation where the glass holding mechanism shown in FIG. 5 causes the protective glass that is the lowermost layer to be fallen off.

Next, a particular configuration of the glass holding mechanism will be described. FIG. 5 is a diagram of the protective glass that is the lowermost layer having the glass holding mechanism according to the first embodiment, viewed from below. FIG. 6 is a partial sectional view explaining a situation where the glass holding mechanism shown in FIG. 5 holds the protective glass that is the lowermost layer. FIG. 7 is a partial sectional view explaining a situation where the glass holding mechanism shown in FIG. 5 causes the protective glass that is the lowermost layer to be fallen off.

The glass holding mechanism 6 according to the first embodiment holds the first protective glass 51 so that the first protective glass 51 that is the lowermost layer can be easily fallen off downward, and is provided in the glass holder 51*a* of the first protective glass 51. The glass holding mechanism 6 has: an engagement mechanism 60 composed of an engaging claw 61, and an elastic member 62 that energizes an end portion of the engaging claw 61; and a through hole 63 through which a pin can be inserted. In the present embodiment, the glass holding mechanism 6 having the engaging mechanism 60 and the through hole 63 is arranged in three positions so as to be spaced from each other in an angle of about 120° in a circumferential direction of the glass holder 51*a*.

A groove portion 64 is formed in an inside of the glass holder 51*a* arranged with the engaging mechanism 60. The engaging claw 61 is rotatably attached to a rotation axis 65 arranged in the groove portion 64. A tip end side (an outside of a radial direction) from the rotation axis 65 of the engaging claw 61 has a claw portion 61*a* that projects from an outer circumference of the glass holder 51*a* to the radial direction, and bends so as to be engaged toward the glass holder 52*a* of the second protective glass 52 that is the upper layer. An inner end side (inside of the radial direction) from the rotation axis 65 of the engaging claw 61 has an operation unit 61*b* arranged in the groove portion 64, for performing engaging by the claw portion 61*a* and releasing of the engaging. The operation unit 61*b* horizontally crosses the through hole 63, and extends in an opposite side (inside of the radial direction) from the rotation axis 65 with the through hole 63 therebetween.

The elastic member 62 is accommodated in the groove portion 64. The elastic member 62 applies an energizing force so as to push the operation unit 61b of the engaging claw 61 downward (a separating direction from the second protective glass 52). Thereby, the engaging claw 61 rotates in an arrow direction (clockwise direction) shown in FIG. 6 around the rotation axis 65, and is held in an engagement state of being engaged in a circumferential edge portion 52b of the glass holder 52a of the second protective glass 52 that is the upper layer, by the claw portion 61a. The protective glass 5 of the galvano scanner 3 in an initial state is in a state where the first protective glass 51 that is the lowermost layer is held with respect to the second protective glass 52 that is the upper layer of the first protective glass 51, by the engaging mechanism 60.

The elastic member 62 described in the present embodiment is composed of a coil spring. However, the elastic member 62 is not limited to the coil spring. The elastic member 62 is sufficient as long as being the one that applies energizing force downward to the operation unit 61b of the energizing claw 61, may be a spring other than a coil spring, for example, a torsion spring, and may be composed of a rubber, a resin, or the like having elasticity.

Next, a method of causing the first protective glass 51 held by the glass holding mechanism 6 to be fallen off downward and operation of the system at that time will be described. First, the galvano scanner 3 having the protective glass 5 having the triple structure in the initial state performs predetermined laser machining (laser welding) with respect to the workpiece W. During the process thereof, when the stain due to the scattered matter that has been scattered is adhered to the first protective glass 51 that is the lowermost layer, the stain is detected by the stain detection unit 14. When detecting the stain, the stain detection unit 14 outputs a detection signal to the robot control unit 11 and the scanner control unit 12.

When the detection signal is input from the stain detection unit 14, the scanner control unit 12 temporarily interrupts the emission of the laser beam L from the laser beam source 13. The timing of the temporal interruption may be immediate after the input of the detection signal, and may be after a series of laser machining is completed after the input of the detection signal. On the other hand, when the detection signal is input from the stain detection unit 14, after the emission of the laser beam L is stopped, the robot control unit 11 controls the robot 2 to move the galvano scanner 3 to the protective glass receiving unit 4.

The protective glass receiving unit 4 has the base 41, and the jig 42 provided on the base 41. As shown in FIG. 7, the pin 43 is erected on an upper surface of the jig 42. The jig 42 described in the present embodiment has three pins 43. The three pins 43 are arranged by being spaced from each other by an angle of about 120° so as to be matched with the positions of the through holes 63 formed in the glass holder 51a of the first protective glass 51.

The robot 2 moves the galvano scanner 3 to a predetermined position above the protective glass receiving unit 4, and performs positioning so that the positions of three pins 43 of the jig 42 of the protective glass receiving unit 4 and the positions of the three through holes 63 of the glass holder 51a are matched. Thereafter, the robot 2 makes the galvano scanner 3 descend to the jig 42 of the protective glass receiving unit 4. When the galvano scanner 3 descends, the three pins 43 on the jig 42 are inserted through the through holes 63. The tip ends of the pins 43 inserted to the through holes 63 abut with the operation unit 61b of the engaging claw 61 horizontally crossing the through holes 63. Thereafter, when the galvano scanner 3 further descends, the pin 43 pushes up the operation unit 61b against the energizing force of the elastic member 62. Thereby, the engaging claw 61 rotates in an arrow direction (counterclockwise direction) shown in FIG. 7 around the rotation axis 65, and the engagement state of the claw portion 61a with respect to the second protective glass 52 is released. Since the engagement state by the claw portion 61a is released, when the galvano scanner 3 ascends thereafter, the first protective glass 51 is not held anymore, is fallen off downward by the gravity, and is dropped to the jig 42.

By the operation described above, the stained first protective glass 51 arranged in the lowermost layer of the galvano scanner 3 is automatically detached. The galvano scanner 3 from which the first protective glass 51 is detached is in a state of including a protective glass 5 having a double structure in which the second protective glass 52 that is the upper layer of the first protective glass 51 is a new "protective glass that is the lowermost layer". Thereafter, after being returned to the line again by the operation of the robot 2, the galvano scanner 3 receives supply of the laser beam L from the laser beam source 13 to restart the laser machining (laser welding) with respect to the workpiece W.

In the remote laser welding system 1 including this glass holding mechanism 6, a series of operation for detaching the stained first protective glass 51 is not performed manually by the worker at all, and is automatically performed only by the operation of the robot 2. Thus, the detaching work of the first protective glass 51 is completed in an extremely short time, and the work can immediately return to the machining work. Accordingly, a stop time of the line can be extremely short, and downtime is minimized.

The galvano scanner 3 including the protective glass 5 having the double structure has a similar configuration to a conventional one. Thus, when the stain is adhered to the second protective glass 52 that is the new lowermost layer, the second protective glass 52 is exchanged manually by the worker as conventional. The adhesion of the stain with respect to the protective glass is not necessary generated often during the machining work. Thus, the exchange of the second protective glass 52 adhered with the stain may be performed at a timing of, for example, after a series of operation ends, after work of one day ends, or regular maintenance of the robot 2 or the galvano scanner 3.

The glass holding mechanism 6 described above is configured to indirectly perform engaging and releasing of the engaging via the glass holder 52a with respect to the second protective glass 52. However, the glass holding mechanism 6 may be configured to directly perform engaging and releasing of the engaging with respect to the second protective glass 52.

Second Embodiment of Glass Holding Mechanism

Figure 8:
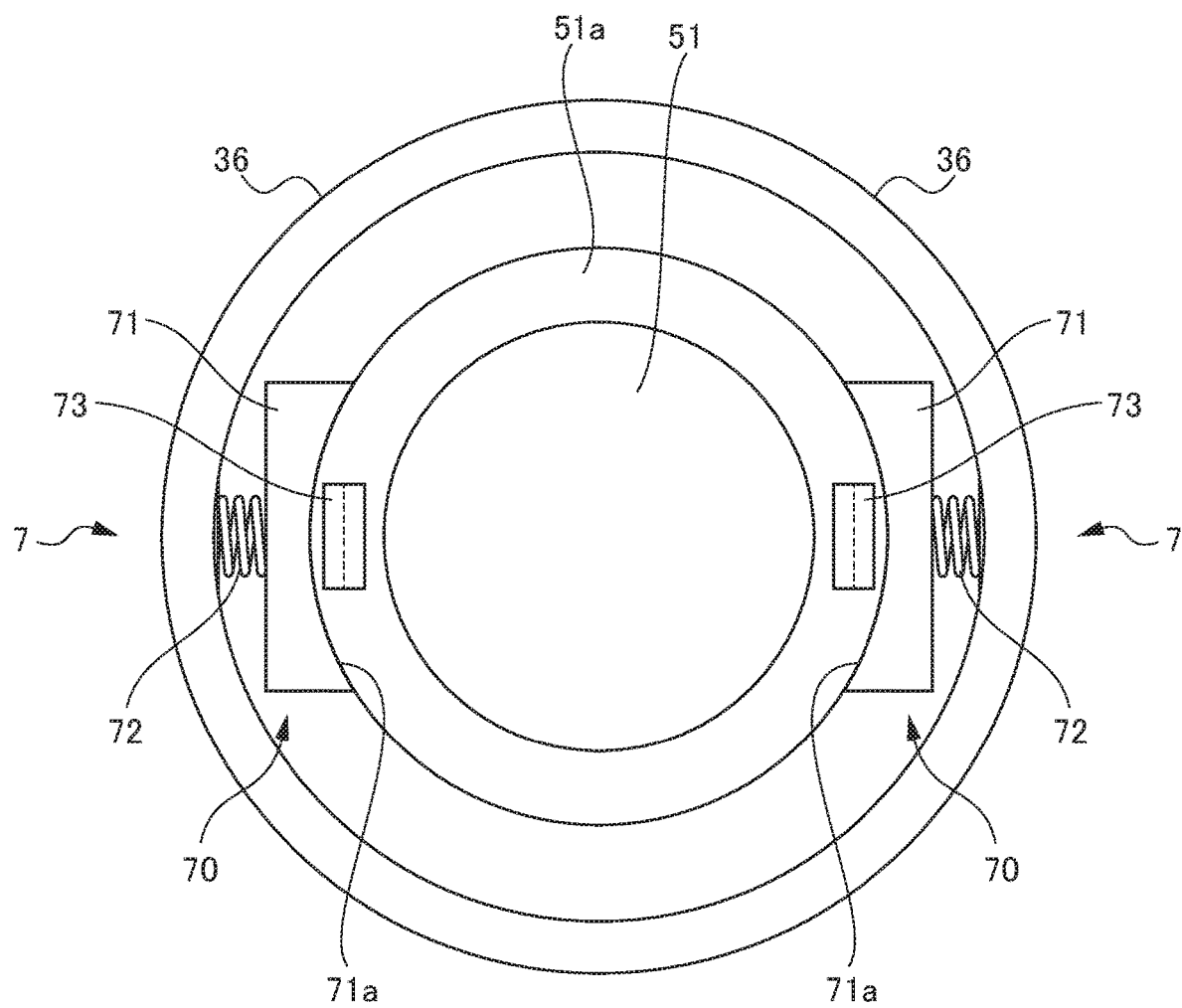
FIG. 8 is a diagram of a protective glass that is the lowermost layer having a glass holding mechanism according to a second embodiment, viewed from below.
Figure 9:
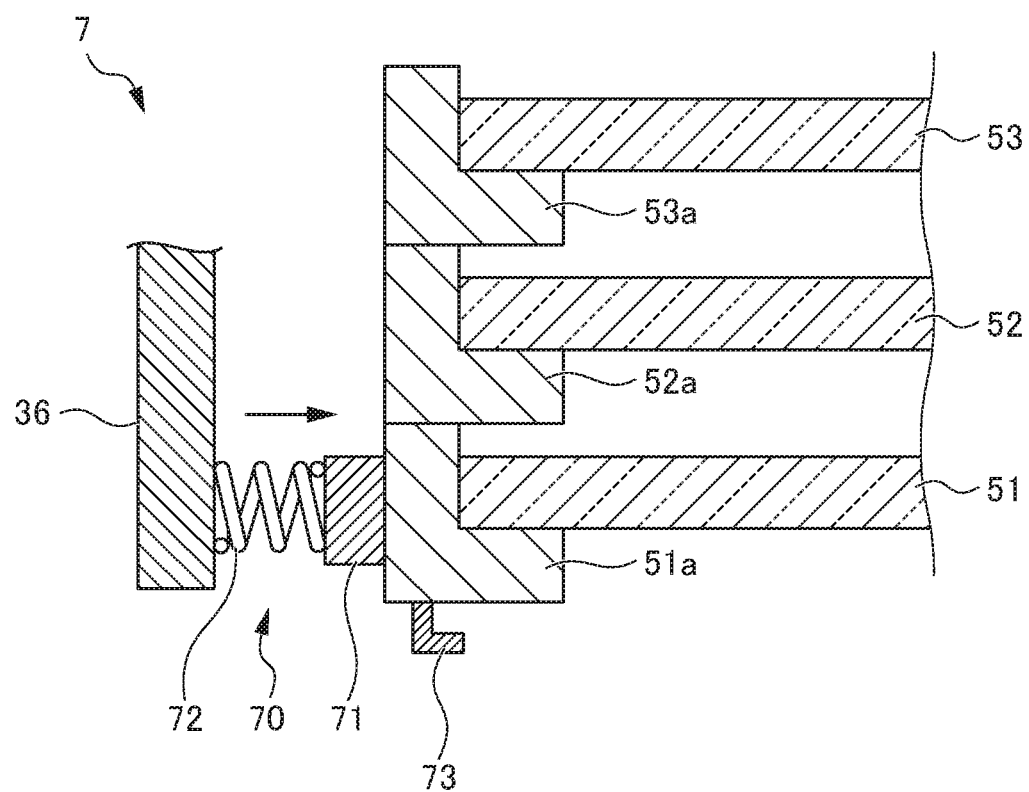
FIG. 9 is a partial sectional view explaining a situation where the glass holding mechanism shown in FIG. 8 holds the protective glass that is the lowermost layer.
Figure 10:
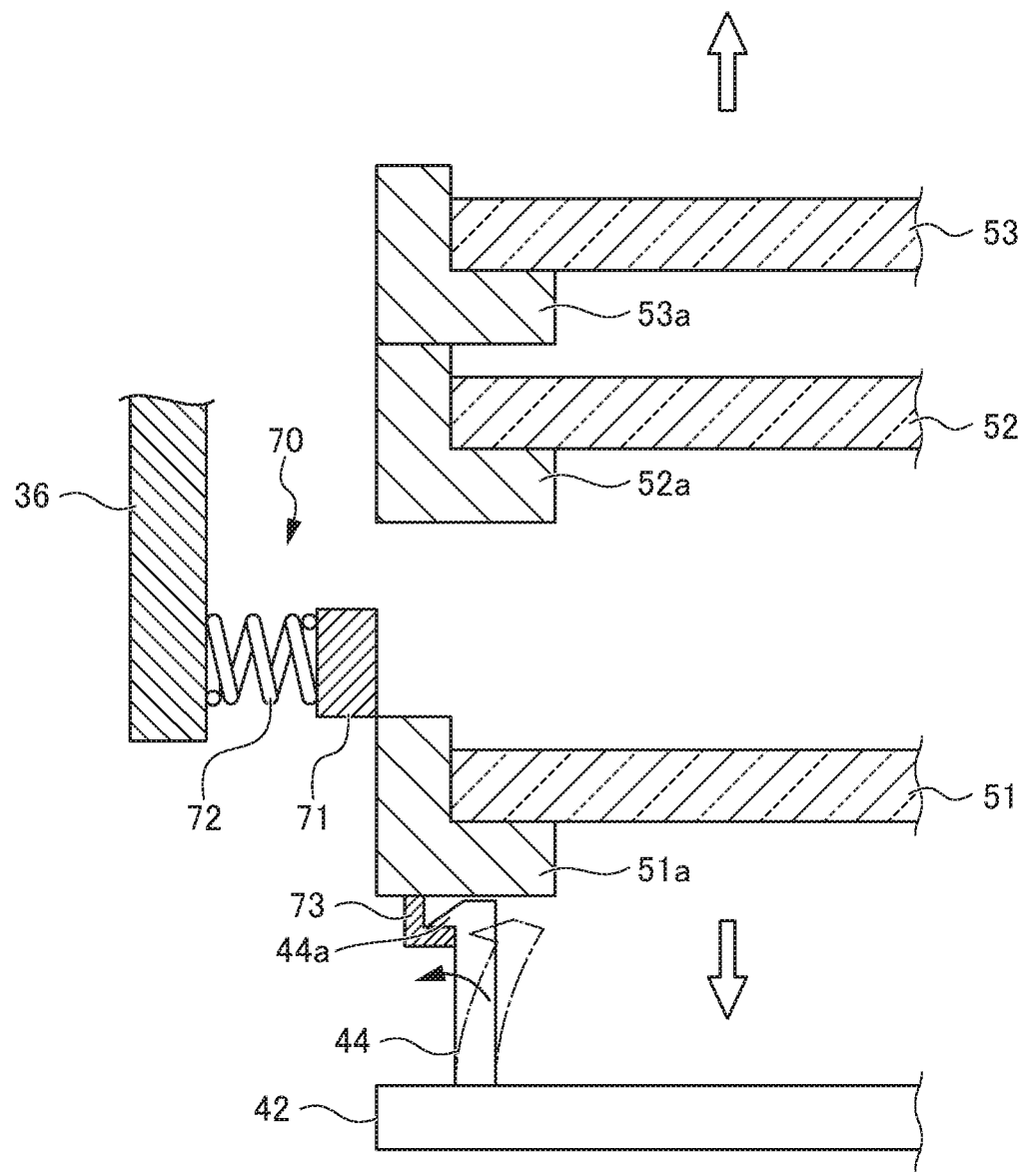
FIG. 10 is a partial sectional view explaining a situation where the glass holding mechanism shown in FIG. 8 causes the protective glass that is the lowermost layer to be fallen off.
Figure 11:
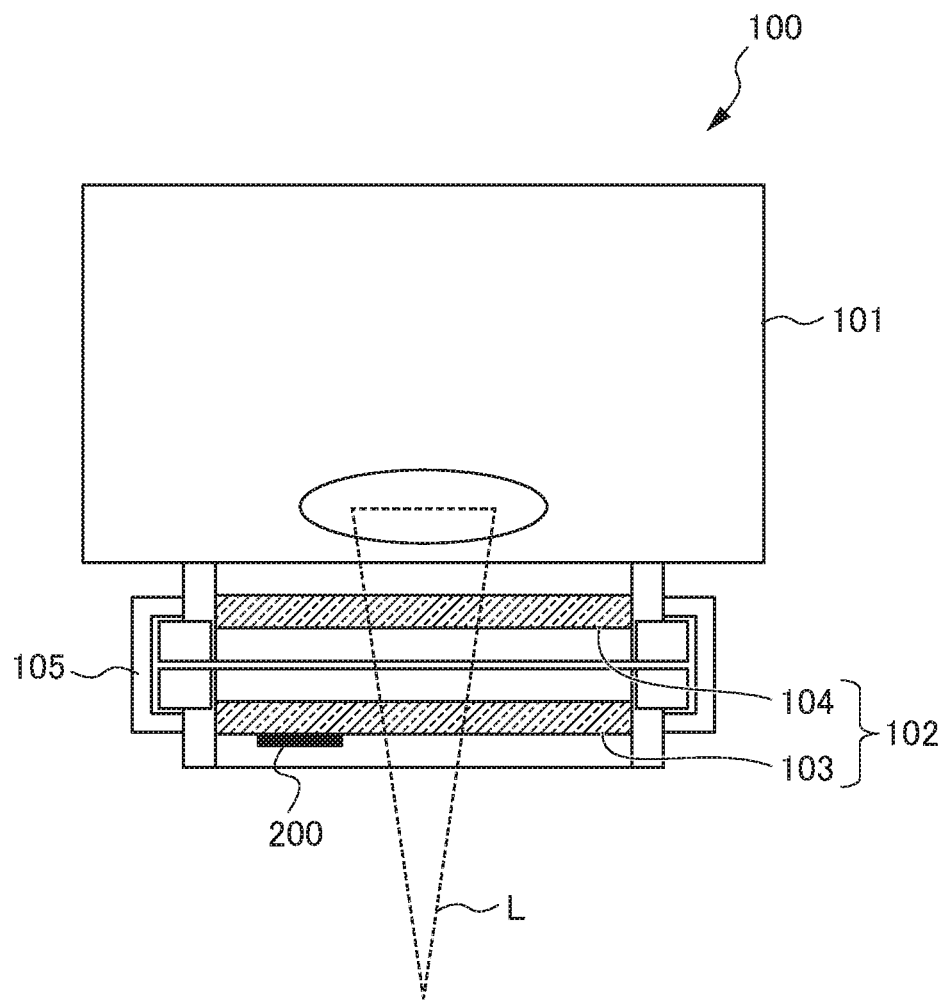
FIG. 11 is a diagram schematically showing a configuration of a conventional galvano scanner in a state of including a protective glass.

Next, a particular configuration of another glass holding mechanism will be described. For features not particularly described, aforementioned description of the first embodiment will be applied or referred as appropriate. FIG. 8 is a diagram of a protective glass that is the lowermost layer having a glass holding mechanism according to a second embodiment, viewed from below. FIG. 9 is a partial sectional view explaining a situation where the glass holding mechanism shown in FIG. 8 holds the protective glass that is the lowermost layer. FIG. 10 is a partial sectional view explaining a situation where the glass holding mechanism shown in FIG. 8 causes the protective glass that is the lowermost layer to be fallen off.

The glass holding mechanism 7 according to the second embodiment holds the first protective glass 51 so that the first protective glass 51 that is the lowermost layer can be easily fallen off downward. The glass holding mechanism 7 is arranged between a cylinder portion 36 provided so as to surround the outer circumference of the protective glass 5 and the first protective glass 51, in the lower surface of the galvano scanner 3. The glass holding mechanism 7 has two friction mechanisms 70 that push the outside surface of the glass holder 51a from two positions facing with each other in the radial direction of the first protective glass 51, and hold the first protective glass 51 by the friction force.

Each of the friction mechanisms 70 is composed of a holding member 71 that abuts with the outside surface of the glass holder 51a of the first protective glass 51, and an elastic member 72 that is arranged between the holding member 71 and the cylinder portion 36 and pushes the holding member 71 to the outside surface of the glass holder 51a. An end surface 71a of the holding member 71 is formed so as to be an arc surface along the outside surface of the glass holder 51a. The first protective glass 51 is sandwiched and pushed by the holding member 71 from both sides by the friction mechanism 70, and is held in the lowermost position of the protective glass 5 by the friction force of the holding member 71.

Hook portions 73 are formed in two positions spaced by an angle of about 180°, in the lower surface of the glass holder 51a of the first protective glass 51. The hook portion 73 is formed inward so as to engage with a hook pin 44 formed in the jig 42 described later.

Next, a method of causing the first protective glass 51 held by the glass holding mechanism 7 to be fallen off downward, and operation of the system at that time will be described. First, predetermined laser machining (laser welding) with respect to the workpiece W is performed by the galvano scanner 3 having the protective glass 5 having the triple structure in the initial state. In the process thereof, when the stain due to the scattered matter that has been scattered is adhered to the first protective glass 51 that is the lowermost layer, the stain is detected by the stain detection unit 14. When detecting the stain, the stain detection unit 14 outputs the detection signal to the robot control unit 11 and the scanner control unit 12.

When the detection signal is input from the stain detection unit 14, the scanner control unit 12 temporarily interrupts the emission of the laser beam L from the laser beam source 13. On the other hand, when the detection signal is input from the stain detection unit 14, after stopping the emission of the laser beam L, the robot control unit 11 controls the robot 2 to move the galvano scanner 3 to the protective glass receiving unit 4.

The protective glass receiving unit 4 has the base 41, and the jig 42 provided on the base 41. As shown in FIG. 10, the hook pin 44 is erected on the upper surface of the jig 42. The jig 42 described in the present embodiment has the two hook pins 44. The two hook pins 44 are arranged by being spaced from each other by an angle of about 180° so as to be matched with the positions of the hook portions 73 formed in the glass holder 51a of the first protective glass 51. The tip end of each of the hook pins 44 has the claw portion 44a formed outward. Each of the hook pins 44 is formed so as to be elastically deformable inward, by, for example, a metal plate, a synthetic resin, or the like.

The robot 2 moves the galvano scanner 3 to a predetermined position above the protective glass receiving unit 4, and performs positioning so that the positions of the two hook pins 44 of the jig 42 of the protective glass receiving unit 4 and the positions of the two hook portions 73 of the glass holder 51a are matched. Thereafter, the robot 2 makes the galvano scanner 3 descend to the jig 42 of the protective glass receiving unit 4. When the galvano scanner 3 descends, the claw portions 44a of the two hook pins 44 on the jig 42 are pushed inward by the hook portions 73, and thereby, the two hook pins 44 elastically deform inward. When the claw portions 44a of the hook pins 44 climb over the hook portions 73, the hook pins 44 elastically recover. Thereby, the claw portions 44a of the hook pins 44 hook on the hook portions 73, and the hook pins 44 and the hook portions 73 are in the engagement state. Thereafter, when the galvano scanner 3 ascends, the first protective glass 51 is pulled out downward against the friction force by the friction mechanism 70. The first protective glass 51 that has pulled out downward is fallen off downward from the glass holding mechanism 7 and is dropped to the jig 42.

By the operation described above, the stained first protective glass 51 arranged in the lowermost layer of the galvano scanner 3 is automatically detached. The galvano scanner 3 from which the first protective glass 51 is detached is in a state of including the protective glass 5 having the double structure in which the second protective glass 52 is the protective glass that is the lowermost layer, as similar to the above description. Thereafter, after being returned to the line again by the operation of the robot 2, the galvano scanner 3 receives the supply of the laser beam L from the laser beam source 7 to restart the laser machining (laser welding) with respect to the workpiece W.

Also in the remote laser welding system 1 including this glass holding mechanism 7, the series of operation for detaching the stained first protective glass 51 is not performed manually by the worker at all, and is automatically performed only by the operation of the robot 2. Thus, the detaching work of the first protective glass 51 is completed in an extremely short time, and the work can immediately return to the machining work. Accordingly, a stop time of the line can be extremely short, and downtime is minimized.

The glass holding mechanism 7 described above is configured to indirectly push the first protective glass 51 via the glass holder 51a. However, the glass holding mechanism 7 is not limited thereto. The glass holding mechanism 7 may be configured to directly push the first protective glass 51.

In the present invention, the protective glass is sufficient as long as at least including the triple structure in the vertical direction. Accordingly, the protective glass in the present invention is not limited to the triple structure described above, and may have a quadruple or more structure. In the case of the quadruple or more structure, the glass holding mechanism 6 or 7 described above may be provided in the protective glass that is the uppermost layer fixed to the emission unit 30, and the two or more protective glasses excluding the protective glass that is the lower layer adjacent to the protective glass that is the uppermost layer. Thus, when the first protective glass that is the lowermost layer among the protective glasses is stained, after the stained first protective glass is fallen off downward and detached as described above, the second protective glass that is the upper layer of the first protective glass is the new "protective glass that is the lowermost layer" (first protective glass). Accordingly, when the new first protective glass is stained, the first protective glass can be fallen off downward as described above, and automatically detached, again. However, in consideration with diffusion and absorption of the laser beam by the protective glass, it is desirable that the number of protective glasses is as small as possible. Thus, it is preferable that the protective glass has the triple structure.

The laser machining system described above exemplifies the one configured to transport the galvano scanner 3 by the robot 2. However, the laser machining system is not limited thereto. For example, the laser machining system may be configured to move the galvano scanner 3 along a guide rail, and make the galvano scanner ascend or descend with respect to the protective glass receiving unit 4. The "configuration in which the protective glass that is the lowermost layer is fallen off downward" of the glass holding mechanism is not limited to the configuration in the aforementioned embodiments.

EXPLANATION OF REFERENCE NUMERALS

1 Remote laser welding system (laser machining system)
11 Robot control unit (control unit)
12 Scanner control unit (control unit)
13 Laser beam source
14 Stain detection unit
2 Robot (movement means)
21 Arm
3 Galvano scanner
30 Emission unit
4 Protective glass receiving unit
43 Pin
5 Protective glass
51 First protective glass (protective glass that is the lowermost layer)
52 Second protective glass (protective glass that is the upper layer of the protective glass that is the lowermost layer)
6, 7 Glass holding mechanism
60 Engaging mechanism
63 Through hole
70 Friction mechanism
L Laser beam

What is claimed is:

1. A galvano scanner that is provided in a tip end of an arm of a robot and irradiates an object with a laser beam to perform machining, the galvano scanner comprising:
   a lens that emits the laser beam;
   a protective glass that protects the lens from a scattered matter generated in machining, the protective glass including at least a triple structure in a vertical direction; and
   a glass holder that holds the protective glass triple structure in the vertical direction,
   the glass holder holding a lowermost layer of the protective glass having the triple structure, so that the lowermost layer of the triple structure of the protective glass can be fallen off in a downward direction by a vertical movement operation of the glass holder by the robot, the glass holder including
      a claw that is provided in the lowermost layer of the protective glass, the claw can perform engaging or releasing of the lowermost layer of the protective glass with respect to an upper layer of the protective glass, and
      a through hole;
   wherein the robot moves the galvano scanner to descend onto a vertically oriented pin such that the pin inserts into the through hole, and the inserted pin contacts and releases the engagement of the claw to the glass holder, and the lowermost layer of the protective glass is fallen off downward when the claw is rotated and released by insertion of the pin into the through hole to contact the claw.

* * * * *